United States Patent [19]

Harris et al.

[11] Patent Number: 4,560,454

[45] Date of Patent: Dec. 24, 1985

[54] ELECTROLYSIS OF HALIDE-CONTAINING SOLUTIONS WITH PLATINUM BASED AMORPHOUS METAL ALLOY ANODES

[75] Inventors: Jonathan H. Harris, Shaker Heights; Michael A. Tenhover, Solon; Robert K. Grasselli, Aurora, all of Ohio; Michael D. Ward, Newark, Del.

[73] Assignee: The Standard Oil Company (Ohio), Cleveland, Ohio

[21] Appl. No.: 705,687

[22] Filed: Feb. 26, 1985

Related U.S. Application Data

[63] Continuation-in-part of Ser. No. 605,700, May 1, 1984.

[51] Int. Cl.$^4$ .................................................. C25B 1/24
[52] U.S. Cl. .................................... 204/128; 148/403; 204/98; 204/293
[58] Field of Search .................... 204/98, 128, 290 R, 204/293; 148/403

[56] References Cited

U.S. PATENT DOCUMENTS

| | | | |
|---|---|---|---|
| 3,856,513 | 12/1974 | Chen et al. | 75/122 |
| 4,036,638 | 7/1977 | Ray et al. | 75/123 B |
| 4,339,270 | 7/1982 | Hashimoto et al. | 204/293 |

FOREIGN PATENT DOCUMENTS

| | | | |
|---|---|---|---|
| 0105453 | 8/1981 | Japan | 148/403 |
| 0105454 | 8/1981 | Japan | 148/403 |
| 0150148 | 11/1981 | Japan | 148/403 |
| 0054286 | 3/1982 | Japan | 204/128 |
| 0107439 | 6/1983 | Japan | 148/203 |
| 2023177 | 12/1979 | United Kingdom | 204/293 |

OTHER PUBLICATIONS

Electrochimica Acta, pp. 1215–1220, "The Anodic Polarization Behavior of Amorphous Pd-T-P Alloys in NaCl Solutions", Hara, Hashimoto & Masumoto.
Journal of Applied Electrochemistry 13, pp. 295–306, "Anodic Characteristics of Amorphous Ternary Palladium-Phosphorus Alloys Containing Ruthenium, Rhodium, Iridium or Platinum in a Hot Concentrated Sodium Chloride Solution", Hara, Hashimoto & Masumoto.
Journal of Non-Crystalline Solids 54, pp. 85–100, "Anodic Characteristics of Amorphous Palladium-Iridium-Phosphorus Alloys in a Hot Concentrated Sodium Chloride Solution, Hara, Hashimoto & Masumoto.

Primary Examiner—Andrew H. Metz
Assistant Examiner—Terryence Chapman
Attorney, Agent, or Firm—T. P. Schur; J. G. Curatolo; L. W. Evans

[57] ABSTRACT

A process for the generation of halogens from halide-containing solutions includes the step of conducting electrolysis of the solutions in an electrolytic cell having a platinum based amorphous metal alloy anode having the formula $$Pt_p A_a D_d$$

where
A is Cr, Mo, W, Fe, Os, Cu, Ni, Ag, V, Au and mixtures thereof;
D is B, Si, Al, Ge, P, As, Sb, Sn and mixtures thereof;
p ranges from about 40 to 92;
a ranges from about 0 to 40; and
d ranges from about 8 to 60, with the proviso that $p+a+d=100$.

Such amorphous metal alloy anodes are also based on the formula $$Pt_p E_e F_f$$

where
E is Cr, Mo, W, Fe, Os, Ir, Cu, Ni, Rh, Pd, Ag, Ti, Ru, Nb, V, Ta, Au and mixtures thereof;
F is B, Al, Ge, As, Sb, Sn and mixtures thereof;
p ranges from about 40 to 92;
e ranges from about 0 to 40; and
f ranges from about 8 to 60, with the proviso that $p+e+f=100$.

28 Claims, No Drawings

ELECTROLYSIS OF HALIDE-CONTAINING SOLUTIONS WITH PLATINUM BASED AMORPHOUS METAL ALLOY ANODES

CROSS-REFERENCE TO RELATED APPLICATION

This application is a continuation-in-part of U.S. Ser. No. 605,700, filed May 1, 1984.

TECHNICAL FIELD

The present invention is directed toward the use of amorphous metal anodes which are electrically conductive in electrolytic cells containing halide solutions and particularly sodium chloride solutions. Amorphous metal alloy materials have become of interest in recent years due to their unique combinations of mechanical, chemical and electrical properties which are specially well suited for newly emerging applications. Amorphous metal materials have compositionally variable properties, high hardness and strength, flexibility, soft magnetic and ferroelectronic properties, very high resistance to corrosion and wear, unusual alloy compositions, and high resistance to radiation damage. These characteristics are desirable for applications such as low temperature welding alloys, magnetic bubble memories, high field superconducting devices and soft magnetic materials for power transformer cores.

Given their resistance to corrosion, the amorphous metal alloys disclosed herein are particularly useful as electrodes in halogen evolution processes. Other uses as electrodes include the production of fluorine, chlorate, perchlorate and persulfate; use as an anode in electrowinning of copper and zinc; use in fuel cells; use in waste water treatment and, in organic reactions such as pinacol formation and electrochemical fluorination of organic compounds. These alloys can also be employed as hydrogen permeable membranes.

BACKGROUND ART

The unique combination of properties possessed by amorphous metal alloy materials may be attributed to the disordered atomic structure of amorphous materials which ensures that the material is chemically homogeneous and free from the extended defects that are known to limit the performance of crystalline materials.

Generally, amorphous materials are formed by rapidly cooling the material from a molten state. Such cooling occurs at rates on the order of $10^{6°}$ C./second. Processes that provide such cooling rates include sputtering, vacuum evaporation, plasma spraying and direct quenching from the liquid state. Direct quenching from the liquid state has found the greatest commercial success inasmuch as a variety of alloys are known that can be manufactured by this technique in various forms such as thin films, ribbons and wires.

U.S. Pat. No. 3,856,513 describes novel metal alloy compositions obtained by direct quenching from the melt and includes a general discussion of this process. The patent describes magnetic amorphous metal alloys formed by subjecting the alloy composition to rapid cooling from a temperature above its melting temperature. A stream of the molten metal was directed into the nip of rotating double rolls maintained at room temperature. The quenched metal, obtained in the form of a ribbon, was substantially amorphous as indicated by X-ray diffraction measurements, was ductile, and had a tensile strength of about 350,000 psi (2415 MPa).

U.S. Pat. No. 4,036,638 describes binary amorphous alloys of iron or cobalt and boron. The claimed amorphous alloys were formed by a vacuum melt-casting process wherein molten alloy was ejected through an orifice and against a rotating cylinder in a partial vacuum of about 100 millitorr. Such amorphous alloys were obtained as continuous ribbons and all exhibit high mechanical hardness and ductility.

U.S. Pat. No. 4,264,358 discloses amorphous superconducting glassy alloys comprising one or more Group IVB, VB, VIB, VIIB or VIII transition metals and one or more metalloids such as B, P, C, N, Si, Ge, or Al. The alloys are stated to have utility as high field superconducting magnet materials.

The amorphous metal alloys described hereinabove have not been suggested for usage as electrodes in electrolytic processes in distinction from the alloys utilized for practice of the present invention. With respect to processes for chlorine evolution from sodium chloride solutions, certain palladium-phosphorus based metal alloys have been prepared and described in U.S. Pat. No. 4,339,270 which discloses a variety of ternary amorphous metal alloys consisting of 10 to 40 atomic percent phosphorus and/or silicon and 90 to 60 atomic percent of two or more of palladium, rhenium and platinum. Additional elements that can be present include titanium, zirconium, niobium, tantalum and/or iridium. The alloys can be used as electrodes for electrolysis and the patent reports high corrosion resistance in the electrolysis of halide solutions.

The anodic characteristics of these alloys have been studied by three of the patentees, M. Hara, K. Hashimoto and T. Masumoto and reported in various journals. One such publication entitled "The Anodic Polarization Behavior of Amorphous Pd-Ti-P Alloys in NaCl Solution" *Electrochimica Acta,* 25, pp. 1215–1220 (1980) describes the reaction of palladium chips and phosphorus at elevated temperatures to form palladium phosphide which is then melted with titanium. The resulting alloy was then formed into ribbons 10 to 30 microns in thickness by the rotating wheel method.

"Anodic Characterstics of Amorphous Ternary Palladium-Phosphorus Alloys Containing Ruthenium, Rhodium, Iridium, or Platinum in a Hot Concentrated Sodium Chloride Solution", reported in the *Journal of Applied Electrochemistry* 13, pp. 295–306 (1983) describes the entitled alloys, again prepared by the rotating wheel method from the molten state. Palladium-silicon alloys were also prepared and evaluated but were found to be unsatisfactory as anodes. The reported anode alloys were found to be more corrosion resistant and had a higher chlorine activity and lower oxygen activity than DSA.

Lastly, "Anodic Characteristics of Amorphous Palladium-Iridium-Phosphorus Alloys in a Hot Concentrated Sodium Chloride Solution" reported in *Journal of Non-Crystalline Solids,* 54, pp. 85–100 (1983) describes such alloys also prepared by the rotating wheel method. Again, moderate corrosion resistance, high chlorine activity and low oxygen activity were reported.

The authors found that the electrocatalytic selectivity of these alloys was significantly higher than that of the known dimensionally stable anodes (DSA) consisting of an oxide mixture of ruthenium, and titanium supported by metallic titanium. A disadvantage of DSA is that the electrolysis of sodium chloride is not entirely selective for chlorine and some oxygen is produced. The alloys reported were less active for oxygen evolution than DSA.

Dimensionally stable anodes are described in the following three early U.S. patents. U.S. Pat. No. 3,234,110 calls for an electrode comprising titanium or a titanium alloy core, coated at least partially with titanium oxide which coating is, in turn, provided with a noble metal coating such as platinum, rhodium, iridium and alloys thereof.

U.S. Pat. No. 3,236,756 discloses an electrode comprising a titanium core, a porous coating thereon of platinum and/or rhodium and a layer of titanium oxide on the core at the places where the coating is porous.

U.S. Pat. No. 3,771,385 is directed toward electrodes comprising a core of a film forming metal consisting of titanium, tantalum, zirconium, niobium and tungsten, carrying an outside layer of a metal oxide of at least one platinum metal from the group consisting of platinum, iridium, rhodium, palladium, ruthenium and osmium.

All three of these electrodes have utility in electrolytic processes although unlike the anodes of the present invention, none are amorphous metals. Thus, despite the state of the art in amorphous metal alloys, there has not been a teaching heretofore of the use of platinum based amorphous metal alloys as anodes in chlorine evolution processes. The specific alloys disclosed herein are extremely corrosion resistant and substantially 100 percent selective to chlorine.

SUMMARY OF THE INVENTION

The process of the present invention comprises the step of conducting electrolysis of halogen-containing solutions in an electrolytic cell having a platinum based amorphous metal alloy anode of the formula $$Pt_pA_aD_d$$

where
A is Cr, Mo, W, Fe, Os, Cu, Ni, Ag, V, Au and mixtures thereof;
D is B, Si, Al, Ge, P, As, Sb, Sn and mixtures thereof;
p ranges from about 40 to 92;
a ranges from about 0 to 40; and
d ranges from about 8 to 60, with the proviso that $p+a+d=100$.

The process of the present invention can also be conducted with a platinum based amorphous metal alloy anode having the formula $$Pt_pE_eF_f$$

where
E is Cr, Mo, W, Fe, Os, Ir, Cu, Ni, Rh, Pd, Ag, Ti, Ru, Nb, V, Ta, Au and mixtures thereof;
F is B, Al, Ge, As, Sb, Sn and mixtures thereof;
p ranges from about 40 to 92;
e ranges from about 0 to 40; and
f ranges from about 8 to 60, with the proviso that $p+e+f=100$.

PREFERRED MODE FOR CARRYING OUT THE INVENTION

The present invention provides a process for the generation of halides from halide-containing solutions which includes the step of conducting electrolysis of said solutions in an electrolytic cell having a platinum based amorphous metal alloy of the formula $$Pt_pA_aD_d$$

where
A is Cr, Mo, W, Fe, Os, Cu, Ni, Ag, V, Au and mixtures thereof;
D is B, Si, Al, Ge, P, As, Sb, Sn and mixtures thereof;
p ranges from about 40 to 92;
a ranges from about 0 to 40; and
d ranges from about 8 to 60, with the proviso that $p+a+d=100$.

The process of the present invention can also be conducted with an anode having the formula $$Pt_pE_eF_f$$

where
E is Cr, Mo, W, Fe, Os, Ir, Cu, Ni, Rh, Pd, Ag, Ti, Ru, Nb, V, Ta, Au and mixtures thereof;
F is B, Al, Ge, As, Sb, Sn and mixtures thereof;
p ranges from about 40 to 92;
e ranges from about 0 to 40; and
f ranges from about 8 to 60, with the proviso that $p+e+f=100$.

The foregoing metal alloys can be binary or ternary with Pt and D or F being mandatory and A or E optional. The use of the phrase "amorphous metal alloys" herein refers to amorphous metal-containing alloys that may also comprise one or more of the foregoing non-metallic elements. Amorphous metal alloys may thus include non-metallic elements such as boron, silicon, phosphorus, arsenic, germanium and antimony. Several preferred combinations of elements include Pt/Si; Pt/Ge; Pt/Ge/Si; Pt/Ag/Si; Pt/B/Si; Pt/Ir/B; Pt/B; Pt/Sb; and Pt/Ge/Al. The foregoing list is not to be construed as limiting but merely exemplary.

These alloys can be prepared by any of the standard techniques for fabricating amorphous metal alloys. Thus, any physical or chemical method, such as electron beam evaporation, chemical and/or physical decomposition, ion-cluster, ion plating, liquid quench or R.F. and D.C. sputtering process can be utilized. The amorphous alloy can be either solid, powder or thin film form, either free standing or attached to a substrate. Trace impurities such as O, N, C, S, Se, Te and Ar are not expected to be seriously detrimental to the preparation and performance of the materials. The only restriction on the environment in which the materials are prepared or operated is that the temperature during both stages be lower than the crystallization temperature of the amorphous metal alloy.

The amorphous metal alloys disclosed herein are particularly suitable as coatings on substrate metals which are then employed as anodes for the generation of halogens. At least one preferred substrate metal for use as the anode is titanium although other metals and various non-metals are also suitable. The substrate is useful primarily to provide support for the amorphous metal alloys and therefore can also be a non-conductor or semi-conductor material. The coating is readily deposited upon the substrate by sputtering, as was done for the examples presented hereinbelow. Coating thicknesses are not crucial and may range broadly, for example, up to about 100 microns although other thicknesses are not necessarily precluded so long as they are practical for their intended use. A useful thickness, exemplified in the work hereinbelow, is 3000 Å.

As will be appreciated, the desired thickness is somewhat dependent upon the process of preparation of the anode and somewhat upon the intended use. Thus, a free-standing or non-supported anode, as prepared by liquid quenching, may have a thickness of approximately 100 microns. Or an amorphous alloy anode can be prepared by pressing the amorphous alloy, in powder from, into a predetermined shape and can also be thick enough to be free-standing. Where a sputtering process is employed, relatively thin layers can be deposited and these would be preferably supported by a suitable substrate, as noted hereinabove. Thus, it is to be understood that the actual anode employed in the present invention is the amorphous metal alloy whether supported or unsupported. Where a very thin layer is employed, a support may be convenient or even necessary to provide integrity.

Irrespective of the use of the amorphous metal alloys, as a coating or a solid product, the alloys are substantially amorphous. The term "substantially" as used herein in reference to the amorphous metal alloy means that the metal alloys are at least fifty percent amorphous. Preferably the metal alloy is at least eighty percent amorphous and most preferably about one hundred percent amorphous, as indicated by X-ray diffraction analysis.

A specific reaction that can occur at the anode in the process for chlorine evolution is as follows:

$$2Cl^- - 2e^- \rightarrow Cl_2$$

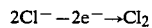

Similarly, at the cathode the corresponding reaction can be but is not necessarily limited to:

$$2H_2O + 2e^- \rightarrow H_2 + 2OH^-$$

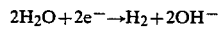

As stated hereinabove, the amorphous metal alloys employed herein are substantially 100 percent selective to chlorine as compared to about 97 percent for DSA materials. This increased selectivity has two significant consequences. First, the chlorine evolution efficiency (per unit electrical energy input) is almost 100 percent, an improvement of about 3 percent or better. Second, separation steps may be obviated due to the neglible oxygen content.

As will be appreciated by those skilled in the art a wide variety of halide-containing solutions can be substituted for sodium chloride such as, for instance, potassium chloride, lithium chloride, cesium chloride, hydrogen chloride, iron chloride, zinc chloride, copper chloride and the like. Products in addition to chlorine can also include, for instance, chlorates, perchlorates and other chlorine oxides. Similarly, other halides can be present, in lieu of chlorides, and thus, other products generated. The present invention is, therefore, not limited by use in any specific halide-containing solution.

The process of electrolysis can be conducted at standard conditions known to those skilled in the art. These include, voltages in the range of from about 1.10 to 2.50 volts (SCE) and current densities of from about 10 to 2000 mA/cm$^2$. Electrolyte solutions (aqueous) are generally at a pH of 2 to 4 and molar concentrations of from about 1 to 4M. Temperature can range between about 0° to 100° C. with a range of 60° to 90° C. being preferred. The cell configuration is not crucial to practice of the process and therefore is not a limitation of the present invention.

In the examples which follow, two platinum based amorphous metal alloys were prepared via radio frequency sputtering in argon gas. A 2" Research S-Gun, manufactured by Sputtered Films, Inc. was employed. As is known, DC sputtering can also be employed. For each of the examples, a titanium substrate was positioned to receive the deposition of the sputtered amorphous alloy. The composition of each alloy was verified by X-ray analysis and was amorphous to X-ray analysis. The distance between the target and the substrate in each instance was approximately 10 cm.

The two amorphous metal alloys were then employed as the anode in a standard three electrode electrochemical test configuration. The reference in the test was SCE and a graphite counter electrode was employed. Linear Sweep voltammograms were obtained in 1M Na$_2$SO$_4$ and 4M NaCl (pH 4.0) solutions. Typical current densities in the chlorine evolution region were measured and have been reported in Table I. For comparison, a polycrystalline platinum anode was also employed which served as a control and current densities therefor have also been included in Table I.

TABLE I

| Current vs. Voltage Results for Linear Sweep Voltammetry | | | | | |
|---|---|---|---|---|---|
| Control Polycrystalline Pt | | Ex. No. 1 Pt$_{75}$Si$_{25}$ | | Ex. No. 2 Pt$_{80}$B$_{20}$ | |
| E(v)$^a$ | I(mA)$^b$ | E(V)$^a$ | I(mA)$^b$ | E(V)$^a$ | I(mA)$^b$ |
| 1.10 | 2.03 | 1.10 | 1.562 | 1.050 | 0.156 |
| 1.15 | 6.72 | 1.15 | 5.312 | 1.075 | 1.170 |
| 1.20 | 14.06 | 1.20 | 10.620 | 1.100 | 3.910 |
| 1.25 | 22.03 | 1.25 | 16.250 | 1.125 | 8.750 |
| 1.30 | 30.31 | 1.30 | 22.500 | 1.150 | 15.780 |
| 1.35 | 39.06 | 1.35 | 28.430 | 1.175 | 23.130 |
| 1.40 | 47.81 | 1.40 | 34.370 | 1.200 | 35.000 |
| 1.45 | 55.94 | 1.45 | 40.310 | 1.225 | 42.500 |
|  |  | 1.50 | 46.250 | 1.250 | 50.000 |
|  |  | 1.55 | 52.500 | 1.300 | 62.600 |
|  |  | 1.60 | 56.250 |  |  |

$^a$Volts vs. SCE
$^b$Electrode area = 1 cm$^2$

When an amorphous Pt/Si anode was exposed to 1M Na$_2$SO$_4$ solution, the anode film appeared quite stable. Linear sweep voltammetry (0 to 1.8 V, 2 mV/s) was performed and no anodic waves were observed until a current onset at +1.25 V which steeply increased beyond this potential. This current was associated with O$_2$ evolution which could be readily observed on the electrode surface.

In 4M NaCl, linear sweep and cyclic voltammetry revealed large current density with a current onset at +1.0 V where little or no current had been observed in Na$_2$SO$_4$. Chlorine gas could be seen evolving off the the electrode surface at +1.1 V.

As to the data presented in Table I, it can be seen that for the anodes exemplified therein the electrocatalytic efficiencies were comparable to that of polycrystalline platinum. However, the amorphous alloy anodes of the present invention also possess corrosion resistance superior to known electrodes.

In order to demonstrate this superiority, corrosion rates were determined for four different anodes as well as for Example No. 2. The anodes compared included: palladium; an amorphous Pd/Si alloy and an amorphous Pd/Ir/Rh/P alloy, both reported by Hara, et al and, a Pd/Ir/Ti/Pd alloy reported by Hara, et al but prepared by R.F. sputtering. Respective corrosion rates of these anodes at 1000 A/m$^2$ in 4M NaCl at 80° C. were measured and are presented in Table II, hereinbelow.

Corrosion rate in μm/yr calculated according to the following formula:

$$\frac{(T)\,\mu m}{(t)\,\text{sec}} \times \frac{3.15 \times 10^7\,\text{sec}}{1\,\text{yr}}$$

where T equals initial thickness of the alloy coating coating and t equals the time in seconds for total corrosion.

TABLE II

Corrosion Rates

| Anode Material | Corrosion rate μm/yr |
|---|---|
| Pd | 100,000 |
| a-Pd$_{80}$Si$_{20}$[a] | >100,000 |
| a-Pd$_{41}$Ir$_{30}$Rh$_{10}$P$_{19}$[b] | 4.0 |
| Pd$_{40}$Ir$_{30}$Ti$_{10}$P$_{20}$ | 12.4 |

[a]Hara, et al, Journal of Applied Electrochemistry, 13, p. 295 (1983).
[b]Hara, et al, Journal of Non-Crystalline Solids, 54, pp. 85 (1983).
[c]Sputtered 2000 Å film.
[d]Example No. 2.

The data reported for the a-Pd$_{80}$Si$_{20}$ anode was estimated from polarization data given relative to Pd. The a-Pd$_{41}$Ir$_{30}$Rh$_{10}$P$_{19}$ anode was the most corrosion resistant material as reported in the *Journal of Non-Crystalline Solids*. As can be seen from Table II, Example No. 2 possessed the greatest corrosion resistance of known metals and amorphous alloys.

In conclusion, although one of the amorphous metal anodes exemplified herein has been utilized in conjunction with the evolution of chlorine gas from sodium chloride solutions such as brine and sea water, it will readily be appreciated by those skilled in the art that other chlorine containing compounds could also be produced via the process of the present invention. Similarly, other halide-containing electrolyte solutions could be substituted for the sodium chloride reported herein with a variety of products being obtained.

It is to be understood that the foregoing examples have been provided to enable those skilled in the art to have representative examples by which to evaluate and practice the process and that these examples should not be construed as any limitation on the scope of this invention. Inasmuch as the composition of the amorphous metal alloys employed in the process can be varied within the scope of the total specification disclosure, neither the particular A, D, E or F components nor the relative amounts of the components in the binary and ternary alloys exemplified herein shall be construed as limitations of the invention.

Thus, it is believed that any of the variables disclosed herein can readily be determined and controlled with departing from the spirit of the invention herein disclosed and described. Moreover, the scope of the invention shall include all modifications and variations that fall within the scope of the attached claims.

We claim:

1. A process for the generation of halogens from halide-containing solutions comprising the step of: conducting electrolysis of said solutions in an electrolytic cell having a platinum based amorphous metal alloy anode having the formula Pt$_p$A$_a$D$_d$ where A is Cr, Mo, W, Fe, Os, Cu, Ni, Ag, V, Au and mixtures thereof;
D is B, Si, Al, Ge, P, As Sb, Sn and mixtures thereof;
p ranges from about 40 to 92;
a ranges from about 0 to 40; and
d ranges from about 8 to 60, with the proviso that $p+a+d=100$.

2. A process, as set forth in claim 1, wherein said platinum based amorphous metal alloy anode is at least 60 percent amorphous.

3. A process, as set forth in claim 1, wherein said platinum based amorphous metal alloy anode is at least 80 percent amorphous.

4. A process, as set forth in claim 1, wherein said platinum based amorphous metal alloy anode is about 100 percent amorphous.

5. A process, as set forth in claim 1, wherein said halide is chloride.

6. A process, as set forth in claim 5, which produces products selected from the group consisting of chlorine, chlorates, perchlorates and other chlorine oxides upon electrolysis of said chloride-containing solutions therewith.

7. A process, as set forth in claim 1, wherein said halide-containing solution comprises sodium chloride solutions.

8. A process, as set forth in claim 7, wherein chlorine is generated at said anode substantially free of oxygen.

9. A process, as set forth in claim 1, wherein said platinum based amorphous metal alloy anode comprises Pt and Si.

10. A process, as set forth in claim 9, wherein said platinum based amorphous metal alloy anode comprises Pt$_{75}$Si$_{25}$.

11. A process, as set forth in claim 1, wherein said platinum based amorphous metal alloy anode comprises Pt and B.

12. A process, as set forth in claim 11, wherein said platinum based amorphous metal alloy anode comprises Pt$_{80}$B$_{20}$.

13. A process, as set forth in claim 1, wherein said platinum based amorphous metal alloy anode has a thickness of up to about 100 microns.

14. A process, as set forth in claim 1, wherein electrolysis is conducted at a voltage range of from about 1.10 to 2.50 volts (SCE) and current densities of from about 10 to 2000 mA/cm$^2$.

15. A process, as set forth in claim 1, wherein electrolysis is conducted at a temperature range of from about 0° to about 100° C.

16. A process for the generation of halogens from halide-containing solutions comprising the step of: conducting electrolysis of said solutions in an electrolytic cell having a platinum based amorphous metal alloy anode having the formula Pt$_p$E$_e$F$_f$ where E is Cr, Mo, W, Fe, Os, Ir, Cu, Ni, Rh, Pd, Ag, Ti, Ru, Nb, V, Ta, Au and mixtures thereof;
F is B, Al, Ge, As, Sb, Sn and mixtures thereof;
p ranges from about 40 to 92;
e ranges from about 0 to 40; and
f ranges from about 8 to 60, with the proviso that $p+e+f=100$.

17. A process, as set forth in claim 16, wherein said platinum based amorphous metal alloy anode is at least 60 percent amorphous.

18. A process, as set forth in claim 16, wherein said platinum based amorphous metal alloy anode is at least 80 percent amorphous.

19. A process, as set forth in claim 16, wherein said platinum based amorphous metal alloy anode is about 100 percent amorphous.

20. A process, as set forth in claim 16, wherein said halide is chloride.

21. A process, as set forth in claim 20, which produces products selected from the group consisting of chlorine, chlorates, perchlorates and other chlorine oxides upon electrolysis of said chloride-containing solutions therewith.

22. A process, as forth in claim 21, wherein said halide-containing solution comprises sodium chloride solutions.

23. A process, as set forth in claim 21, wherein chlorine is generated at said anode substantially free of oxygen.

24. A process, as set forth in claim 16, wherein said platinum based amorphous metal alloy anode comprises Pt, Ir and B.

25. A process, as set forth in claim 24, wherein said platinum based amorphous metal alloy anode comprises $Pt_{50}Ir_{40}B_{10}$.

26. A process, as set forth in claim 16, wherein said platinum based amorphous metal alloy anode has a thickness of up to about 100 microns.

27. A process, as set forth in claim 16, wherein electrolysis is conducted at a voltage range of from about 1.10 to 2.50 volts (SCE) and current densities of from about 10 to 2000 $mA/cm^2$.

28. A process, as set forth in claim 16, wherein electrolysis is conducted at a temperature range of from about 0° to about 100° C.

* * * * *